United States Patent [19]

Morita

[11] Patent Number: 5,212,697
[45] Date of Patent: May 18, 1993

[54] VARIABLE LENGTH CHARACTER STRING DETECTION APPARATUS

[75] Inventor: Tetsuya Morita, Yokohama, Japan

[73] Assignee: Ricoh Company, Ltd., Tokyo, Japan

[21] Appl. No.: 859,627

[22] Filed: Mar. 20, 1992

Related U.S. Application Data

[63] Continuation of Ser. No. 405,122, Sep. 11, 1989, abandoned.

[30] Foreign Application Priority Data

Sep. 13, 1988 [JP] Japan .................. 63-227502

[51] Int. Cl.⁵ .............................................. G06F 7/02
[52] U.S. Cl. .................. 371/68.1; 371/67.1; 364/715.11
[58] Field of Search .............. 364/715.11; 371/67.1, 371/68.1

[56] References Cited

U.S. PATENT DOCUMENTS

| | | | |
|---|---|---|---|
| 3,274,379 | 9/1966 | Hinrichs | 371/67.1 X |
| 3,760,355 | 9/1973 | Bruckert | 382/34 X |
| 4,290,115 | 9/1981 | Pitt et al. | 364/900 |
| 4,471,459 | 9/1984 | Dickinson et al. | 364/900 |
| 4,490,811 | 12/1984 | Yianilos et al. | 364/900 |
| 4,524,345 | 6/1985 | Sybel et al. | 364/715.11 |
| 4,554,631 | 11/1985 | Reddington | |
| 4,728,925 | 3/1988 | Randle et al. | 340/146.2 |
| 4,845,610 | 7/1989 | Parvin | 364/200 |
| 4,896,133 | 1/1990 | Methvin et al. | 364/715.11 X |

OTHER PUBLICATIONS

Takahashi et al., "String Matching Hardware Architecture," Denshi Tsushin Gakki Kenkyu Hokoku (computer system), CPSY 86-87, Jul. 1986 (partial English translation).

Ronald A. Fisher, "Statistical Method For Research Workers," Oliver & Voyd Limited Publ., 1925, pp. 62-89 (English Translation from pp. 67-73).

Myamoto et al, "Generation of a Pseudothesaurus for Information Retrieval Based on Cooccurrences and Fuzzy Set Operations," *IEEE Transactions on Systems, Man, Cybernetics*, vol. SMC-13, No. 1, Jan./Feb. 1983, pp. 62-70.

*Primary Examiner*—Robert W. Beausoliel, Jr.
*Assistant Examiner*—Allen M. Lo
*Attorney, Agent, or Firm*—Mason, Fenwick & Lawrence

[57] ABSTRACT

A variable length character string detection apparatus comprises a character collating part which registers a character string and compares each character of an input character string with each character making up the registered character string so as to output character string collating signals which respectively indicate whether or not each character of the input character string coincides with one of the characters making up the registered character string, a partial character string detecting part for carrying out predetermined logic operations on the character string collating signals and for outputting partial character string collating signals which respectively indicate whether or not the registered character string which coincides with the input character string and partial character strings thereof exist, and a detection pattern control part for carrying out a predetermined logic operation on the partial character string collating signals and for outputting collating result signals which respectively indicate whether or not the registered character string which coincides with the input character string, the partial character strings thereof and erroneous character strings exist.

12 Claims, 12 Drawing Sheets

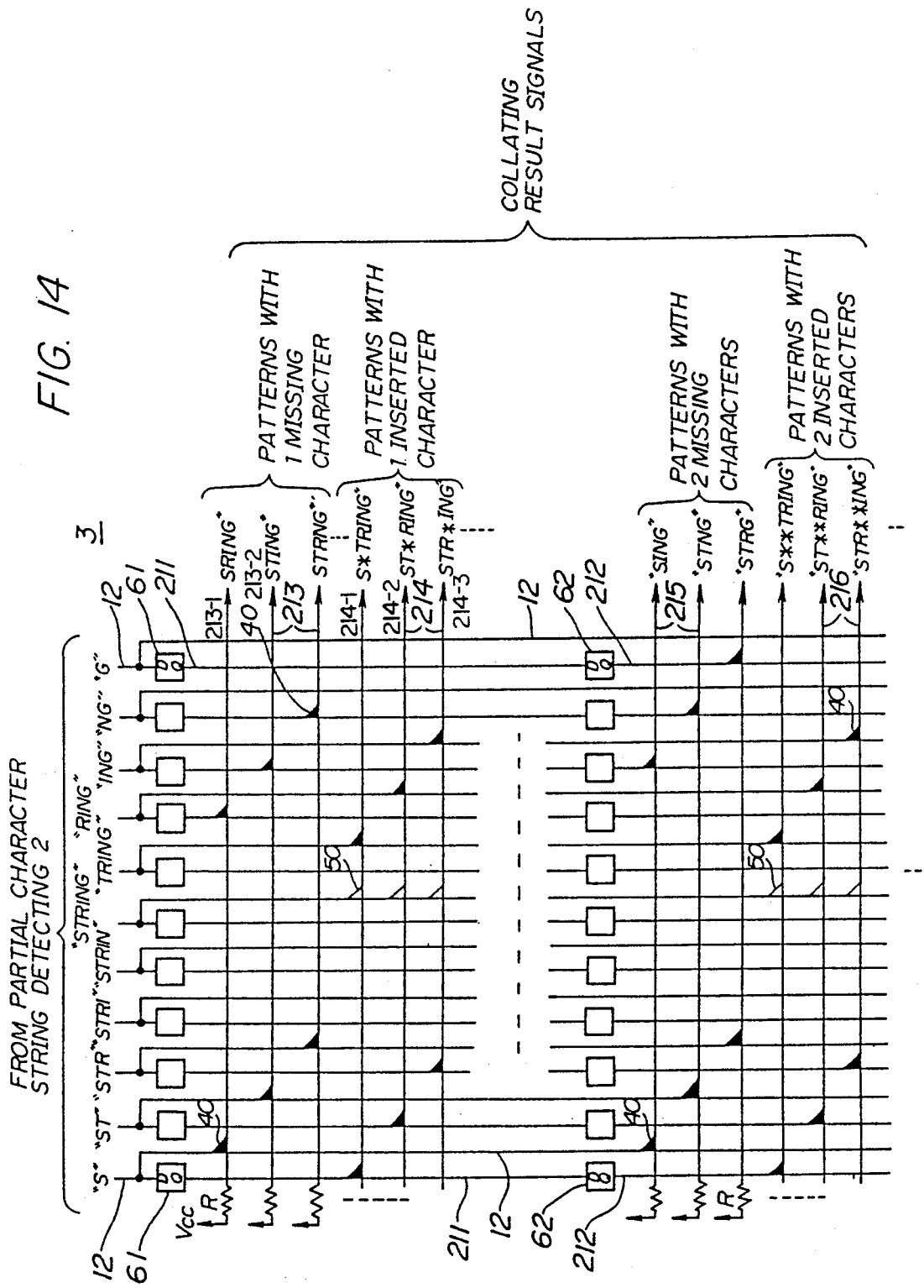

VARIABLE LENGTH CHARACTER STRING DETECTION APPARATUS

This application is a continuation of U.S. Pat. application Ser. No. 07/405,122, filed Sep. 11, 1989, now abandoned.

BACKGROUND OF THE INVENTION

The present invention generally relates to variable length character string detection apparatuses, and more particularly to a variable length character string detection apparatus which enters a document file stored in a secondary storage and collates a character strings with a registered character string so as to detect the registered character string and erroneous character strings from the document file (text).

As conventional character string detection methods, there are the (1) sort/search method, (2) associative memory method, (3) cellular array method, (4) finite state automaton method, (5) dynamic programming method and the like. However, these methods suffer the following disadvantages. That is, the methods (2) and (3) cannot process long character strings, the methods (1), (2), (3) and (5) cannot make a non-anchor matching of variable length character strings, the method (5) has a slow processing speed, and the methods (3), (4) and (5) cannot realize a small hardware size.

On the other hand, there is a character string search large scale integrated circuit (LSI) proposed by Nippon Electric Co., Ltd. of Japan which combines the methods (2) and (4). This character string search LSI (intelligent string search processor or ISSP) is discussed in Takahashi et al., "Architecture of String Matching Hardware", Denshi Tsushin Gakkai Kenkyu Hokoku (computer system), CPSY 86-57, July 1986. But even in this case, the scale of the apparatus is proportional to a tolerable number of erroneous characters. For this reason, the realized character string search LSI has a tolerable number of erroneous characters which is only in the order of one erroneous character due to the restriction of the hardware structure.

SUMMARY OF THE INVENTION

Accordingly, it is a general object of the present invention to provide a novel and useful variable length character string detection apparatus in which the problems described above are eliminated.

Another and more specific object of the present invention is to provide a variable length character string detection apparatus comprising character collating means including first means for registering a character string as a registered character string, second means for entering an input character string from a file and comparator means for comparing each character of the input character string with characters making up the registered character string and for outputting character string collating signals which respectively indicate whether or not each character of the input character string coincides with one of the characters making up the registered character string, partial character string detecting means for carrying out predetermined logic operations on the character string collating signals and for outputting partial character string collating signals which respectively indicate whether or not the registered character string which coincides with the input character string and partial character strings thereof exist, and detection pattern control means for carrying out a predetermined logic operation on the partial character string collating signals and for outputting collating result signals which respectively indicate whether or not the registered character string which coincides with the input character string, the partial character strings thereof and erroneous character strings which respectively include one or a plurality of consecutive errors exist. According to the variable length character string detection apparatus of the present invention, it is possible to detect with respect to the registered character string the correct character string pattern, the character string pattern with N consecutive erroneous characters, the character string pattern with N consecutive missing characters, and the character string pattern with N consecutive excessive characters. In addition, the required hardware is simple compared to that of the conventional apparatus. Further, the variable length character string detection apparatus is suited for production in a form of a very large scale integrated circuit (VLSI) because it comprises repetitions of identical modules.

Other objects and further features of the present invention will be apparent from the following detailed description when read in conjunction with the accompanying drawings.

BRIEF DESCRIPTION OF THE DRAWINGS

FIG. 14 is an annotated version of the circuit in FIG. 7, used in conjunction with the description of FIGS. 8-10.

DESCRIPTION OF THE PREFERRED EMBODIMENTS

It is possible to design the ISSP so as to detect all patterns of N erroneous characters, missing (dropped out) characters and excessive (inserted) characters. But in actual practice, an error which is generated in a transmission path and an error which is generated within the secondary storage are mostly burst errors and rarely random errors. Accordingly, the present invention detects only the N consecutive erroneous characters, N consecutive missing characters and N consecutive excessive characters so as to handle only consecutive errors and reduce the scale of the hardware.

Figure 1:
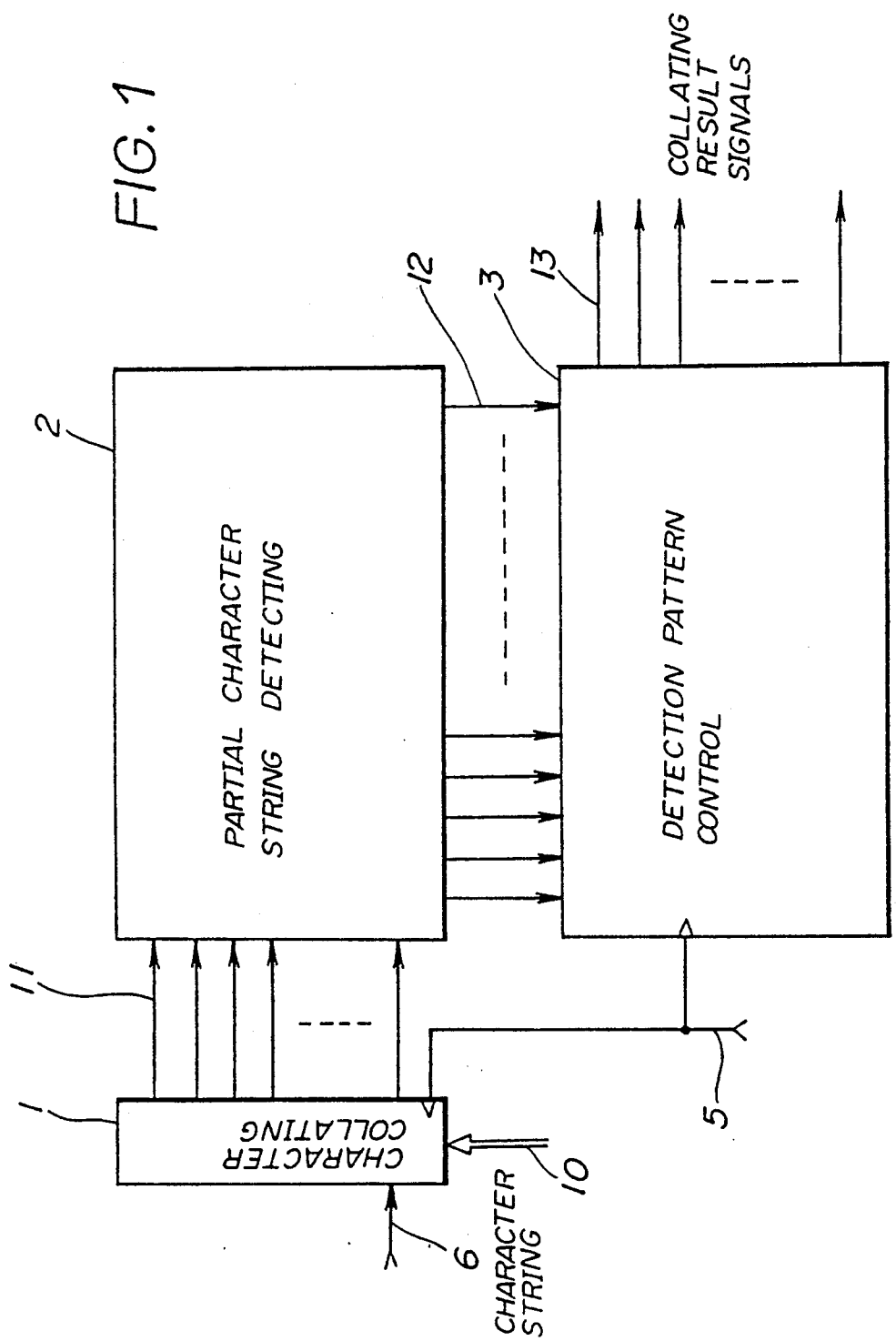
FIG. 1 is a system block diagram showing an embodiment of a variable length character string detection apparatus according to the present invention.

A description will now be given of an embodiment of a variable length character string detection apparatus according to the present invention, by referring to FIG. 1. A variable length character string detection apparatus shown in FIG. 1 enters a document file which is stored in a secondary storage such as a magnetic disc and an optical disc, collates each character of an input character string with each character of a registered character string, and detects whether or not the input character string is identical to the registered character string. The variable length character string detection apparatus also detects one or a plurality of consecutive erroneous, missing or excessive characters in the input character string.

The variable length character string apparatus comprises a character collating part 1, a partial character string detecting part 2 and a detection pattern control part 3 which carry out input and output operations in synchronism with a shift clock signal 5. The character collating part 1 comprises a plurality of character registers, and a character string detected from the document file or the like is registered beforehand as a registered character string. When detecting the character string from the document file or the like, the character collating part 1 compares each character of an input character string 10 with each of corresponding characters of the registered character string and outputs character collating signals 11 which are respectively indicative of whether or not there is an identical character in the registered character string. The partial character string detecting part 2 enters the character collating signals 11 and carries out a predetermined logic operation thereon. The partial character string detecting part 2 outputs partial character string collating signals 12 which are respectively indicative of the existence of a registered character string which is identical to the input character string 10 and its partial character strings. The detection pattern control part 3 inputs the partial character string collating signals 12 and carries out a predetermined logic operation thereon. The detection pattern control part 3 outputs collating result signals 13 which are respectively indicative of the existence of a registered character string which is identical to the input character string 10 and various strings including its partial character strings.

Figure 2:
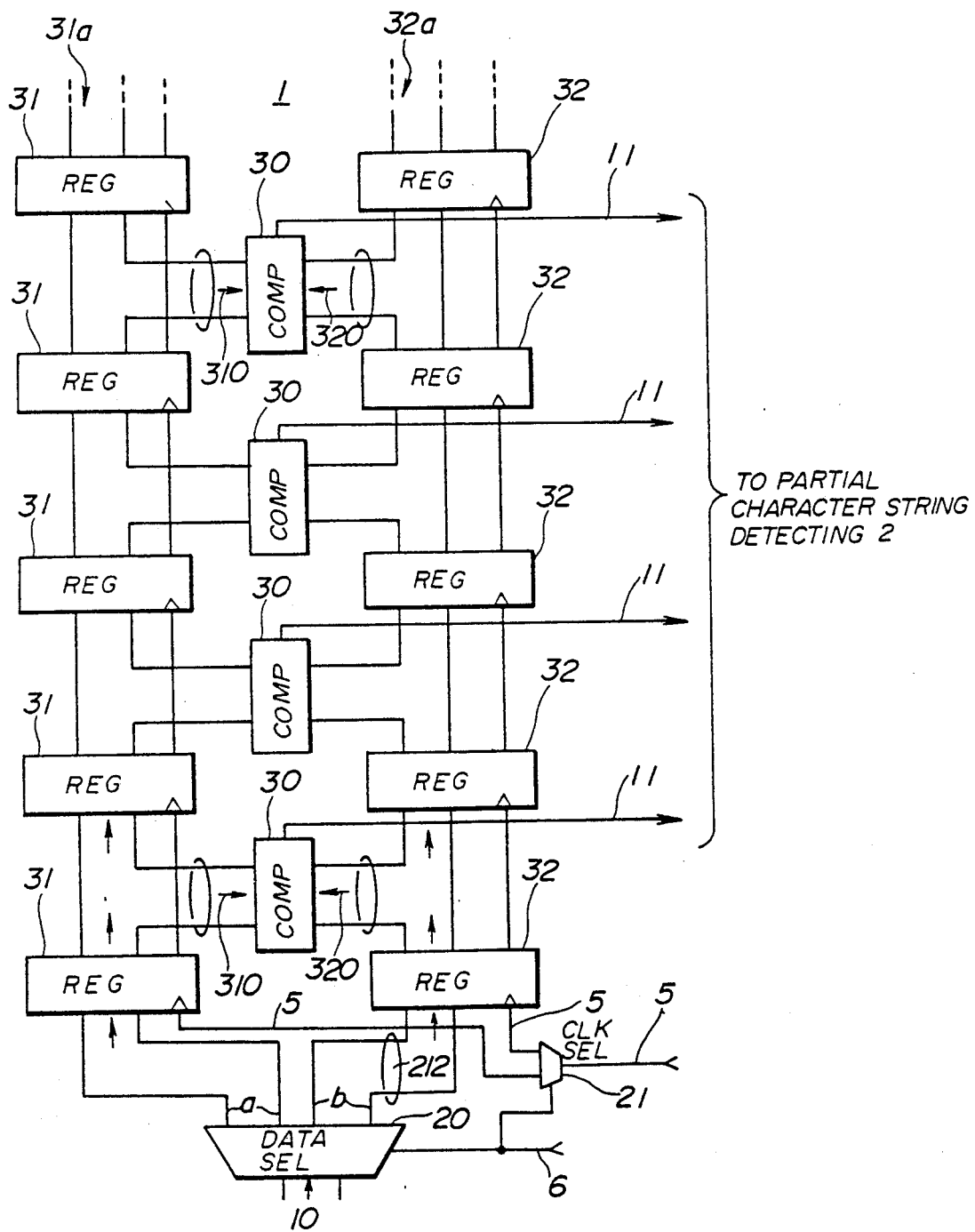
FIG. 2 is a system block diagram showing an embodiment of a character collating part shown in FIG. 1.

FIG. 2 shows an embodiment of the character collating part 1. The character collating part 1 comprises a data selector 20, a clock selector 21, a plurality of registers 31 for character registration, a plurality of registers 32 for character collating, and a plurality of comparators 30 which are connected as shown in FIG. 2. When the data selector 20 receives the character string 10 which is to be registered at the time of a registration, an output a of the data selector 20 is supplied to the register 31. On the other hand, when the data selector 20 receives the input character string 10 of the document file or the like at the time of a collating, an output b of the clock selector 21 is supplied to the register 32. The clock selector 21 outputs the shift clock signal 5 to the registers 31 at the time of the registration and outputs the shift clock signal 5 to the registers 32 at the time of the collating. A registration/collating selection signal 6 controls the outputs of the data selector 20 and the clock selector 21.

The registers 31 are coupled in series and constitute a shift register 31a, while the registers 32 are coupled in series and constitute a shift register 32a. At the time of the registration, each character of the character string 10 which is to be registered is successively shifted in the registers 31 of the shift register 31a in synchronism with the shift clock signal 5 so as to register the character string 10. On the other hand, at the time of the collating, each character of the input character string 10 from the document file or the like is successively shifted in the registers 32 of the shift register 32a in synchronism with the shift clock signal 5. Each comparator 30 receives an output 310 of a corresponding register 31 and an output 320 of a corresponding register 32 and makes the corresponding output character collating signal 11 active when the two outputs coincide. The means for registering the character string 10 which is to be registered is not limited to the shift register 31a, and for example, it is possible to employ a read only memory (ROM) which registers the registering character string 10 beforehand.

The following Table shows an example of the character string which is registered in the character collating part 1 and character string patterns which can be detected by the embodiment. In the Table, a symbol "*" denotes an arbitrary character which is incorrect with respect to the registered character string.

TABLE

Registered Character String: "STRING"

| Character String Pattern with N Erroneous Characters: | |
|---|---|
| One Erroneous Character | Two Erroneous Characters |
| "*TRING" | "**RING" |
| "S*RING" | "S**ING" |
| "ST*ING" | "ST**NG" |
| "STR*NG" | "STR**G" |
| "STRI*G" | "STRI**" |
| "STRIN*" | |

| Character String Pattern with N Missing Characters: | |
|---|---|
| One Missing Character | Two Missing Characters |
| "TRING" | "RING" |
| "SRING" | "SING" |
| "STING" | "STNG" |
| "STRNG" | "STRG" |
| "STRIG" | "STRI" |
| "STRIN" | |

| Character String Pattern with N Excessive Characters: | |
|---|---|
| One Excessive Character | Two Excessive Characters |
| "S*TRING" | "S**TRING" |
| "ST*RING" | "ST**RING" |
| "STR*ING" | "STR**ING" |
| "STRI*NG" | "STRIN**G" |
| "STRIN*G" | |

Figure 4:
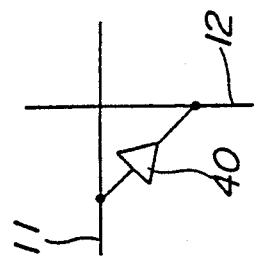
FIG. 4 is a diagram showing an embodiment of an open collector type buffer shown in FIG. 3.
Figure 3:
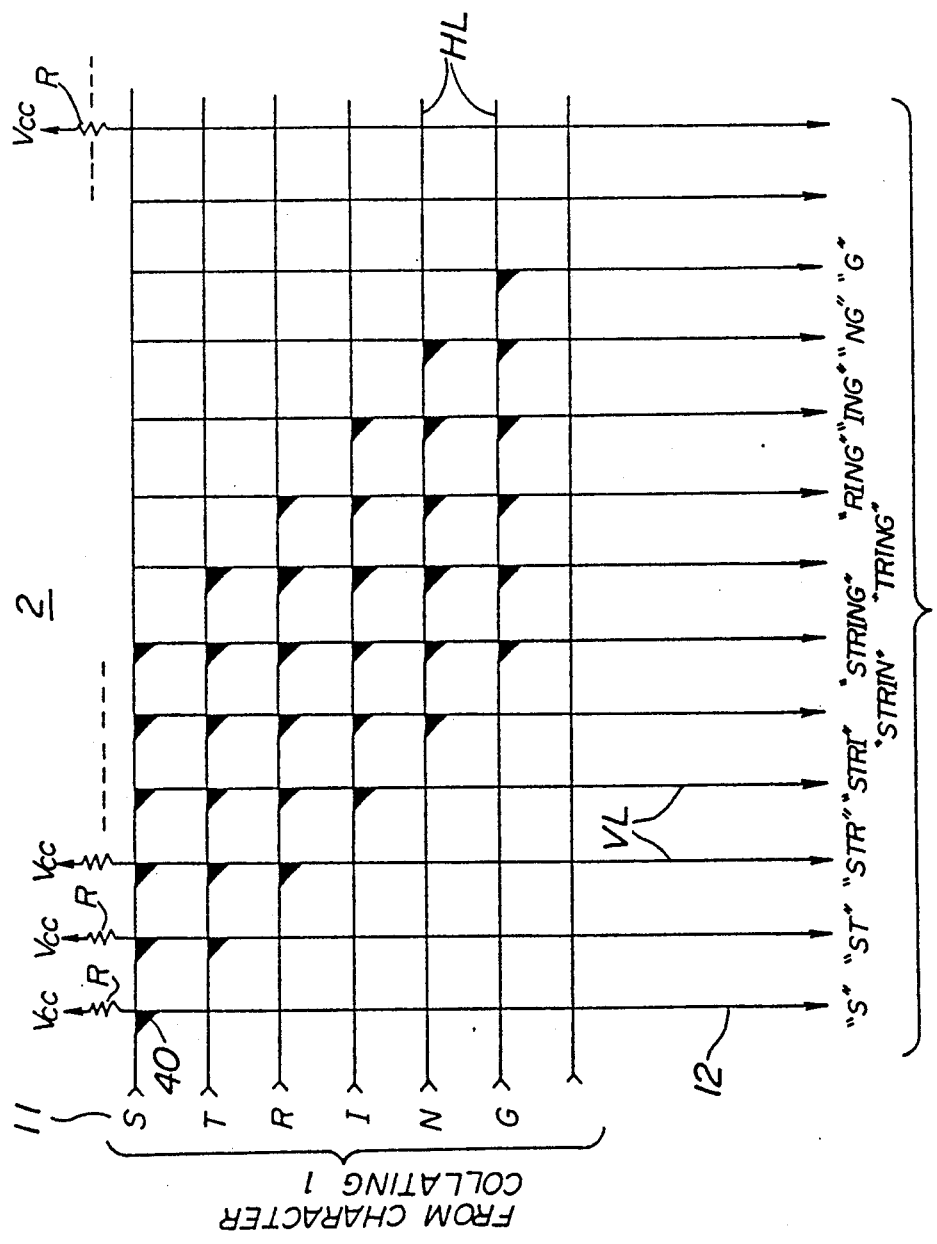
FIG. 3 is a diagram showing an embodiment of a partial character string detecting part shown in FIG.1.

FIG. 3 shows an embodiment of the partial character string detecting part 2. The partial character string detecting part 2 comprises vertical lines (columns) VL which are respectively applied with a voltage Vcc via a resistor R, horizontal lines (rows) HL which are applied with the character string collating signal 11 in synchronism with the shift clock signal 5, and open collector type buffers 40 which respectively couple predetermined columns VL to predetermined rows HL. Each open collector type buffer 40 is connected as shown in FIG. 4. The open collector type buffers 40 obtain logical products of the character string collating signals 11 and output to the corresponding columns VL the partial character string collating signals 12 for detecting the registered character string and the partial character strings which comprise N consecutive characters of the registered character string.

For example, when the registered character string is "STRING", the detected partial character strings are "S", "ST", "STR", "STRI", "STRIN", "STRING", "TRING", "RING", "ING", "NG", "G" and the like. The partial character string collating signals 12 becomes active when the corresponding ones of the above partial character strings exist in the document file or the like.

Figures 5, 6:
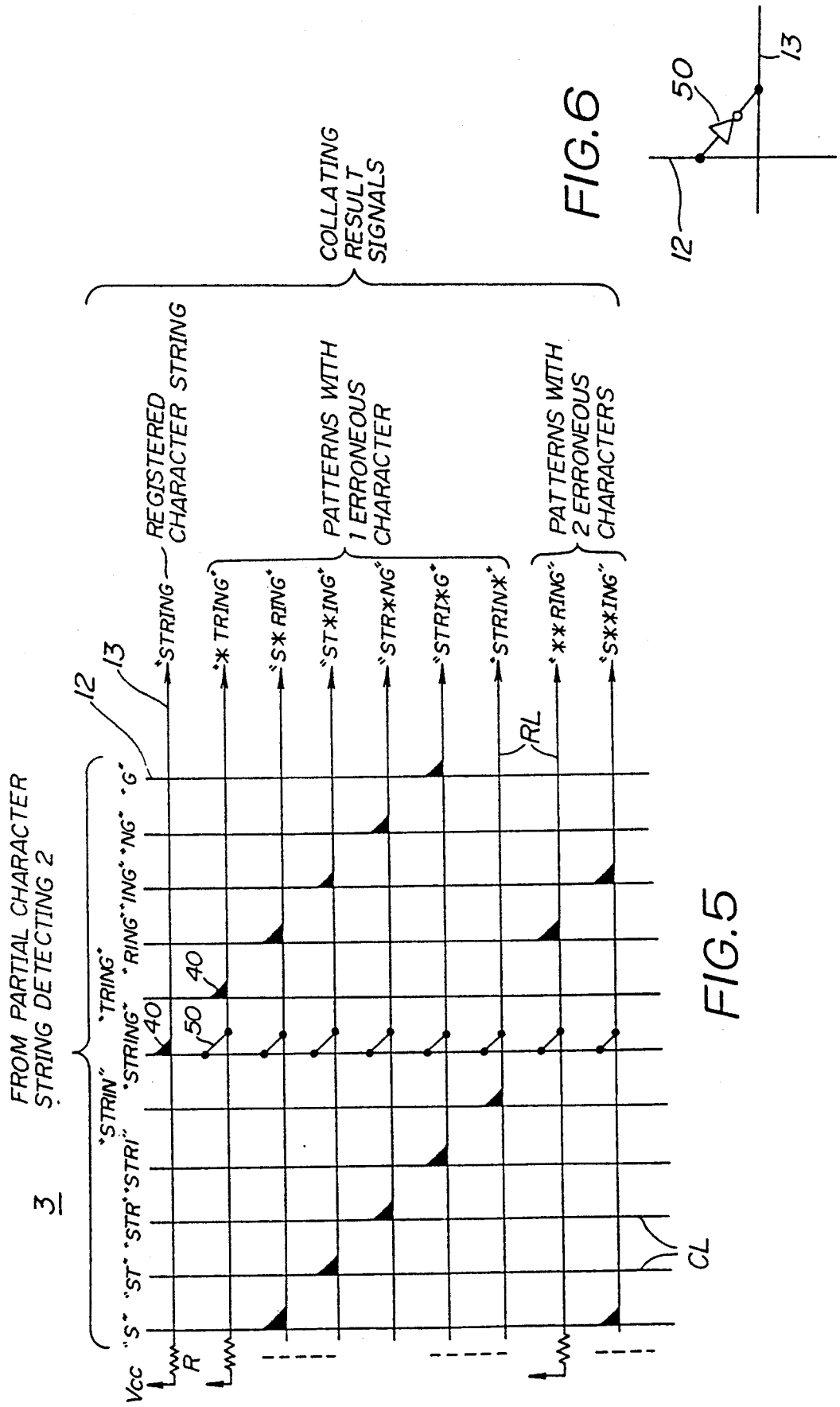
FIG. 5 is a diagram showing an embodiment of a detection pattern control part shown in FIG. 1.
FIG. 6 is a diagram showing an embodiment of an open collector type inverting buffer shown in FIG. 5.

FIG. 5 shows an embodiment of the detection pattern control part 3. The detection pattern control part 3 comprises columns CL which receive the partial character string collating signal 12 from the partial character string detecting part 2, rows RL which are respectively applied with a voltage Vcc via a resistor R, and open collector type inverting buffers 50 which respectively couple predetermined columns CL to predetermined rows RL. Each open collector type inverting buffer 50 is connected as shown in FIG. 6. The open collector type buffers 40 obtain logical products of the active partial character string collating signals 12 which are received from the columns CL and output to the corresponding rows RL the collating result signals 13. The open collector type inverting buffers 50 obtain logical products of the negatives (inverted signals) of the partial character string collating signals 12 which are received from the columns and output to the corresponding rows RL the collating result signals 13. When the collating result signals 13 become active, the collating result signal 13 which corresponds to "STRING" indicates that the registered character string exists in the document file or the like, the collating result signals 13 which correspond to "*TRING", ..., "STRIN*" indicate that the character string patterns with one character error exist in the document file or the like, and the collating result signals 13 which correspond to "RING" and "SING" indicate that the character string patterns with two character errors exist in the document file or the like.

Figure 7:
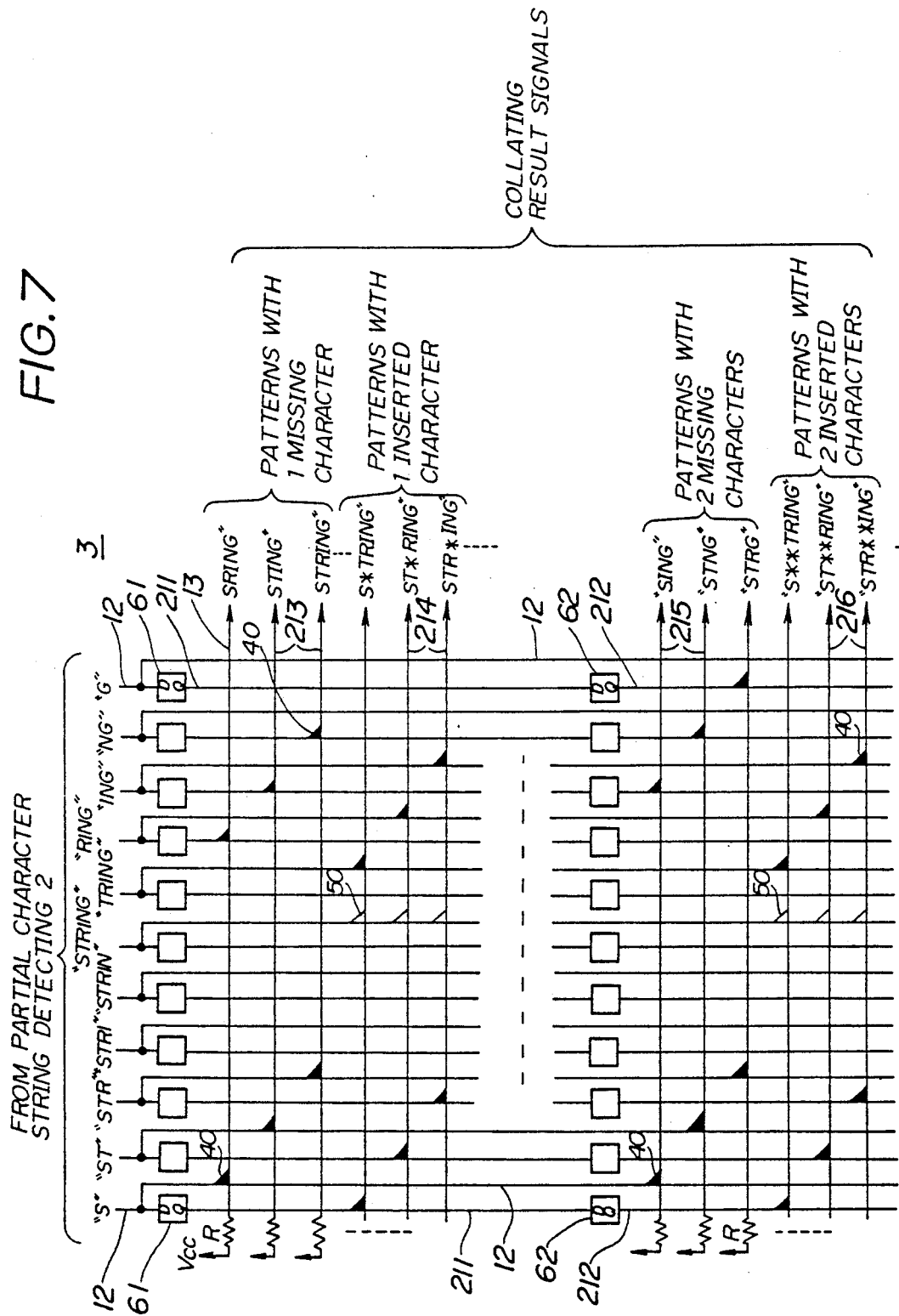
FIG. 7 is a diagram showing another embodiment of the detection pattern control part shown in FIG. 1.

FIG. 7 shows another embodiment of the detection pattern control part 3. This embodiment of the detection pattern control part 3 detects the character string pattern with N missing characters and N excessive characters, where N is a natural number. The detection pattern control part 3 comprises a plurality of 1-bit latch circuits 61 and 62 which are connected in series as shown. The latch circuits 61 and 62 respectively are a delay element which delays the partial character string collating signal 12 which is received from a terminal D by one clock in synchronism with the shift clock signal 5 and outputs the delayed partial character string collating signal 12 from a terminal Q. Hence, the partial character string collating signal 12 which is delayed by one clock is output to a column 211 which is connected to the terminal Q of the latch circuit 61, and the partial character string collating signal 12 which is delayed by two clocks is output to a column 212 which is connected to the terminal Q of the latch circuit 62. Hence, the character string pattern with one missing character such as "SRING" and "STRNG" is output to a row 213 which is coupled to the column line 211 via the buffer 40, and the character string pattern with one excessive character such as "S*TRING" and "STR*ING" is output to a row 214 which is coupled to the column of "STRING" via the inverting buffer 50. Similarly, the character string pattern with two missing characters such as "SING" and "STNG" is output to a row 215 which is coupled to the column line 212 via the buffer 40, and the character string pattern with two excessive characters such as "STRING" and "STRING" is output to a row 216 which is coupled to the columns of "STRING" via the inverting buffer 50. Accordingly, it is possible to detect one or more consecutive erroneous characters.

Next, a description will be given of the case where the character string (registered character string) which is to be detected from the document file (information) is "STRING". In the character collating part 1 shown in FIG. 2, the data selector 20 and the clock selector 21 are set to supply the respective outputs to the registers 31 responsive to the registration/collating selection signal 6, and the character string 10 is registered by inputting the character string 10 in synchronism with the shift clock signal 5.

When making a variable length character string detection, the data selector 20 and the clock selector 21 are set to supply the respective outputs to the registers 32 responsive to the registration/-collating selection signal 6, and the input character string (information) 10 is input from the document file or the like in synchronism with the shift clock signal 5. The input character string 10 is compared with the registered character string one character at a time in the comparators 30, and the results of the comparisons are output as the character collating signals 11.

In the partial character string detecting part 2 shown in FIG. 3, logical products are obtained with respect to predetermined character collating signals 11 which are input to the rows, and the partial character strings of the character string 10 are detected by outputting the logical products to the columns. As shown in FIG. 3, it is possible to obtain the partial character string collating signal 12 by connecting the character collating signal 11 and the partial character string collating signal 12 of the character which is to be detected by use of the buffer 40. For example, when the character string "STR" which comprises three characters is to be detected, the partial character string collating signals 12 and the character collating signals 11 which correspond to the characters "S", "T" and "R" are connected. The term "connecting" in this case does not mean a physical connection for obtaining electrically the same potentials, but means a connection using the open collector type buffer 40 so as to logically constitute a wired AND.

In the detection pattern control part 3 shown in FIG. 5, only the required signals out of the partial character string detection signals 12 input to the detection pattern control part 3 are connected to the collating result signals 13 so that the character strings with N erroneous characters can be detected. For example, the character string pattern "S*RING" with one erroneous character can be constituted by connecting the partial character string collating signal 12 which corresponds to "S", the partial character string collating signal 12 which corresponds to "RING" and a negative signal of the partial character string collating signal 12 which corresponds to "STRING". The negative signal of the partial character string collating signal 12 which corresponds to "STRING" is connected in this embodiment because this embodiment is designed to detect the incorrect character string out of the character string patterns satisfying "S*RING". If this negative signal of the partial character string collating signal 12 which corresponds to "STRING" is not connected, it then becomes possible to detect the character string pattern which includes the correct character string.

In the detection pattern control part 3 shown in FIG. 7, N stages of the latch circuits 61 and 62 are provided with respect to the partial character string collating signals 12 so that the character string pattern with N missing characters and the character string pattern with N excessive characters can be detected. For example, the signal for detecting the character string pattern "SRING" with one missing character can be obtained by connecting the signal which corresponds to "RING" of one clock before and the signal which corresponds to "S" of the present to the collating result signal 13, because "S" is detected one clock after the detection of "RING" when the character string "SRING" is input to the character collating part 1. The character string pattern with two or more missing characters can be detected similarly.

In order to obtain the signal for detecting the character string pattern "S*TRING" with one excessive character, the signal which corresponds to "S" of one clock before and the signal which corresponds to "TRING" of the present, and the negative signal of the signal which corresponds to "STRING" of the present are connected to the collating result signal 13. This is also because "TRING" is detected one clock after the detection of "S" when the character string "S*TRING" is input to the character collating part 1. The character string pattern with two or more excessive characters can be detected similarly.

As in the case of the character string pattern with one or more erroneous characters, this embodiment adds the negative signal of the signal which corresponds to "STRING" which is the registered character string (correct character string). However, it is possible to detect the character strings including the correct character string by not adding this negative signal. When detecting the character string pattern with N missing characters, there is no possibility of the correct character string appearing, and there is no need to add the negative signal of the correct character string.

Therefore, according to the variable length character string detection apparatus of the present invention, it is possible to detect with respect to the registered character string the correct character string pattern, the character string pattern with N consecutive erroneous characters, the character string pattern with N consecutive missing characters, and the character string pattern with N consecutive excessive characters.

Figure 8:
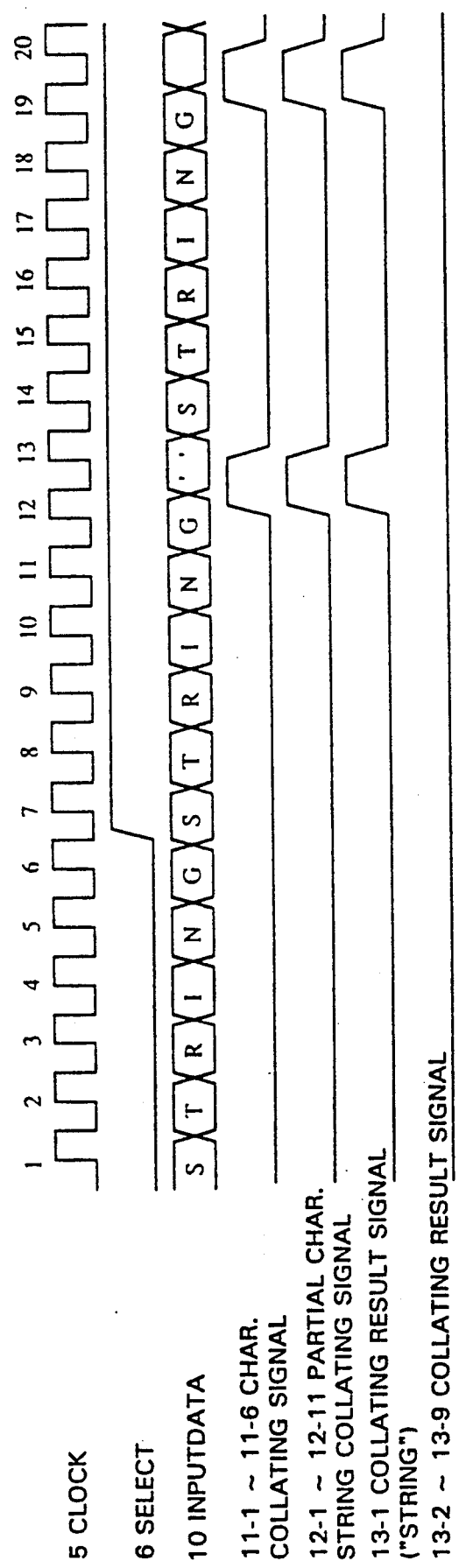
FIG. 8 is a timing diagram of control signals produced when the character "STRING" is encountered.
Figure 9:
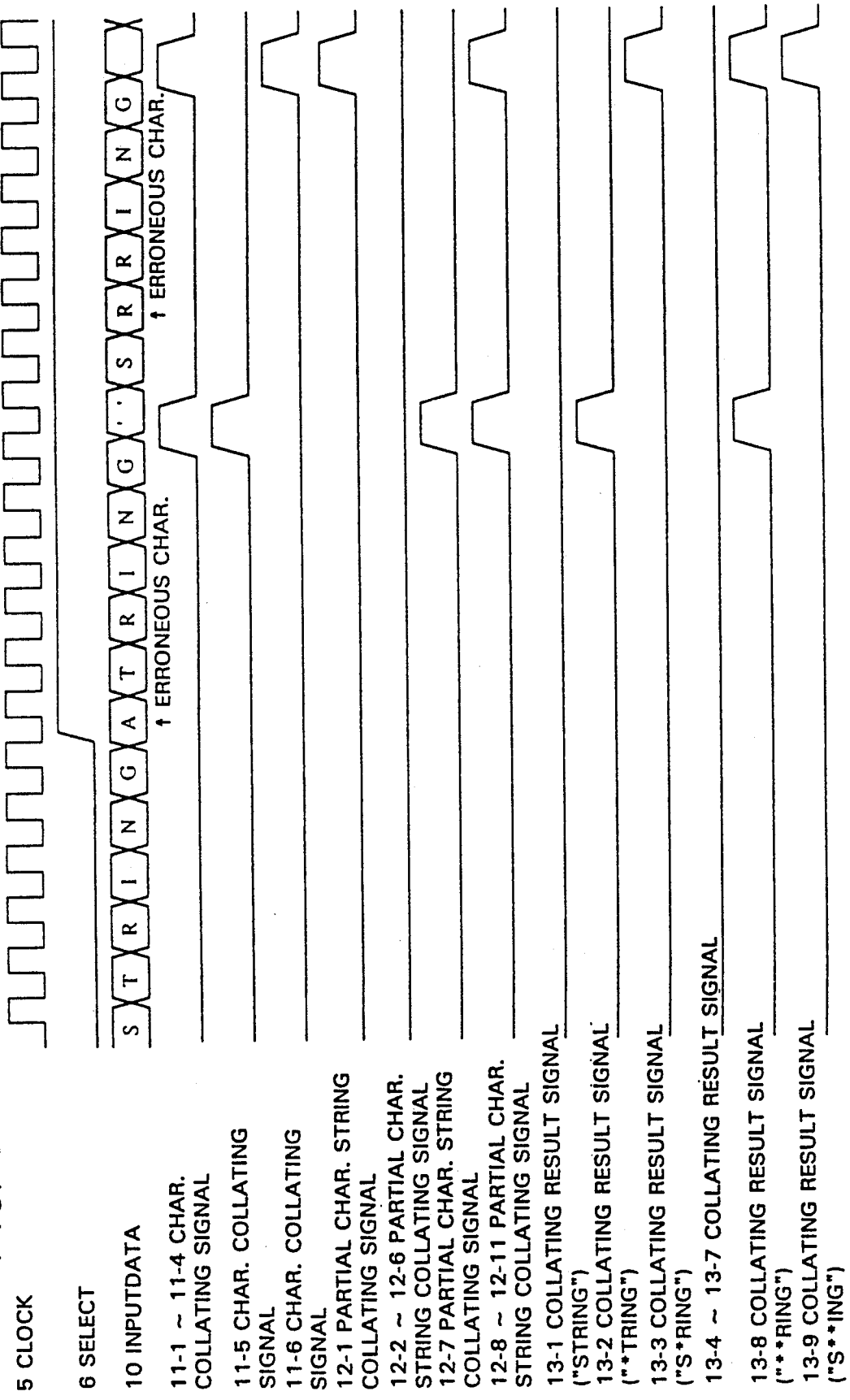
FIG. 9 is a timing diagram of control signals produced when an erroneous character string is encountered.
Figure 10:
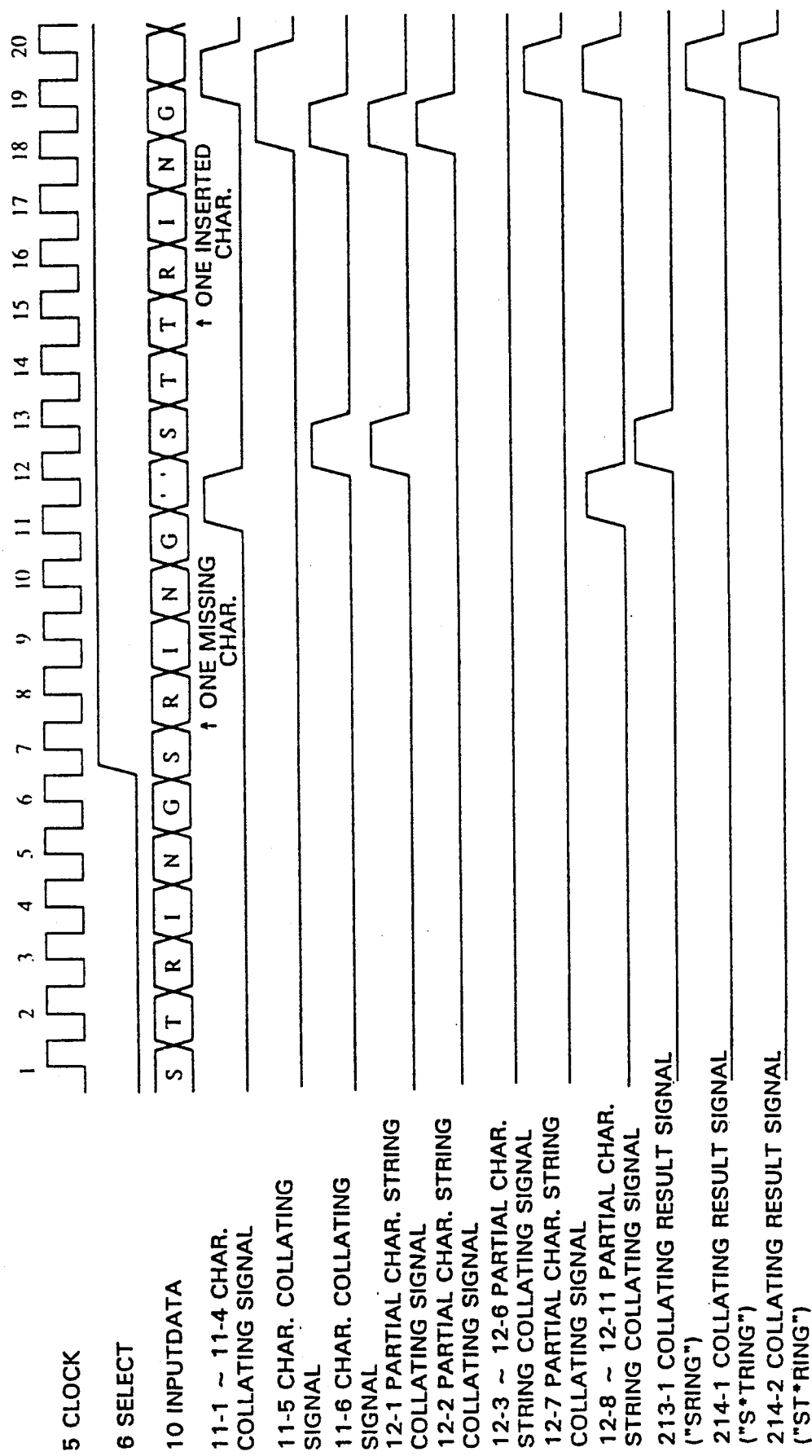
FIG. 10 is a timing diagram of control signals produced when a character string is encountered which has erroneously missing or inserted characters.

Further, the present invention is not limited to these embodiments, but various variations Purely for purposes of convenience for the reader, three suitable timing diagrams are illustrated in FIGS. 8, 9 and 10. The timing diagrams demonstrate an exemplary manner in which control wave forms may be implemented in an exemplary embodiment.

Figure 11:
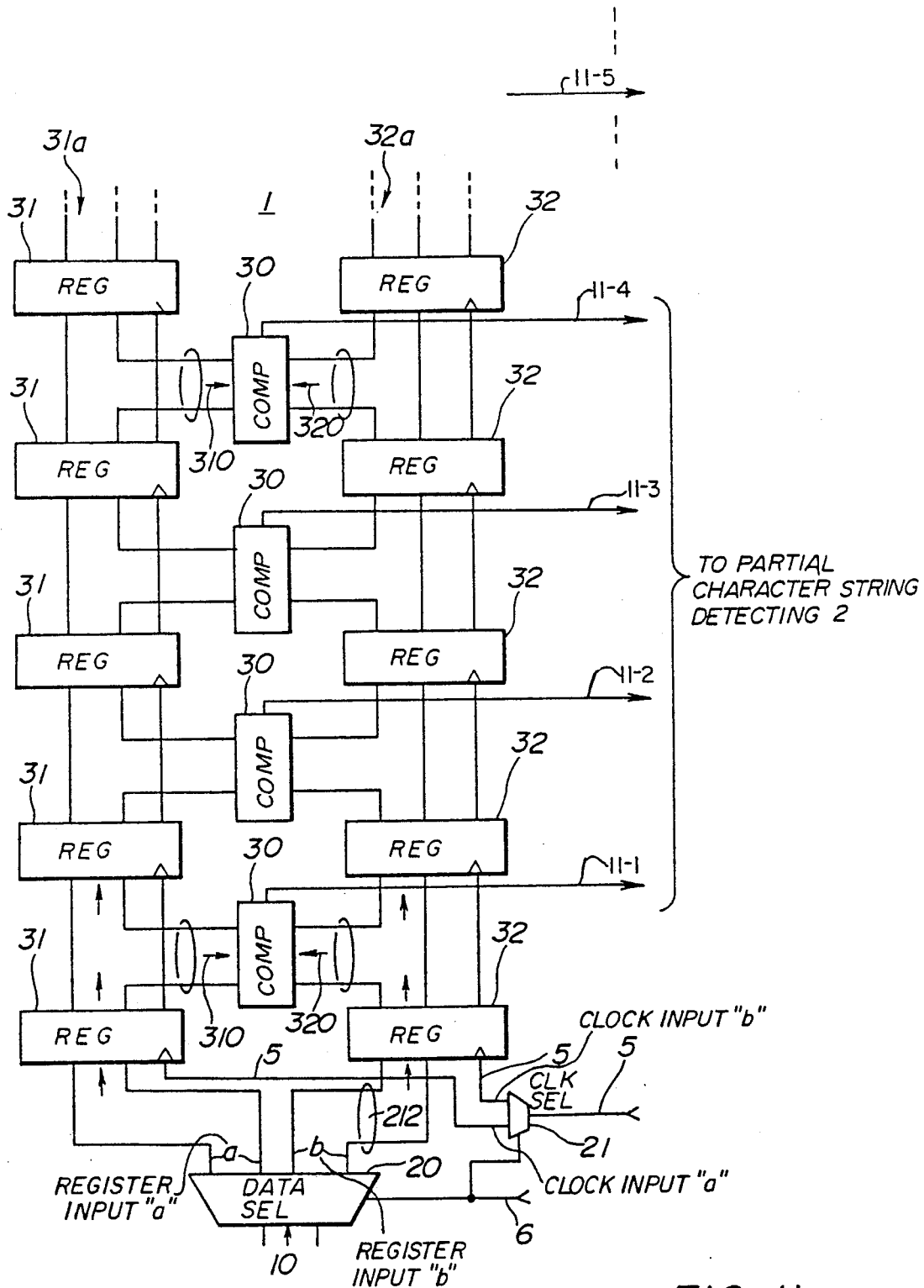
FIG. 11 is an annotated version of the circuit in FIG. 2, used in conjunction with the description of FIGS. 8-10.
Figure 12:
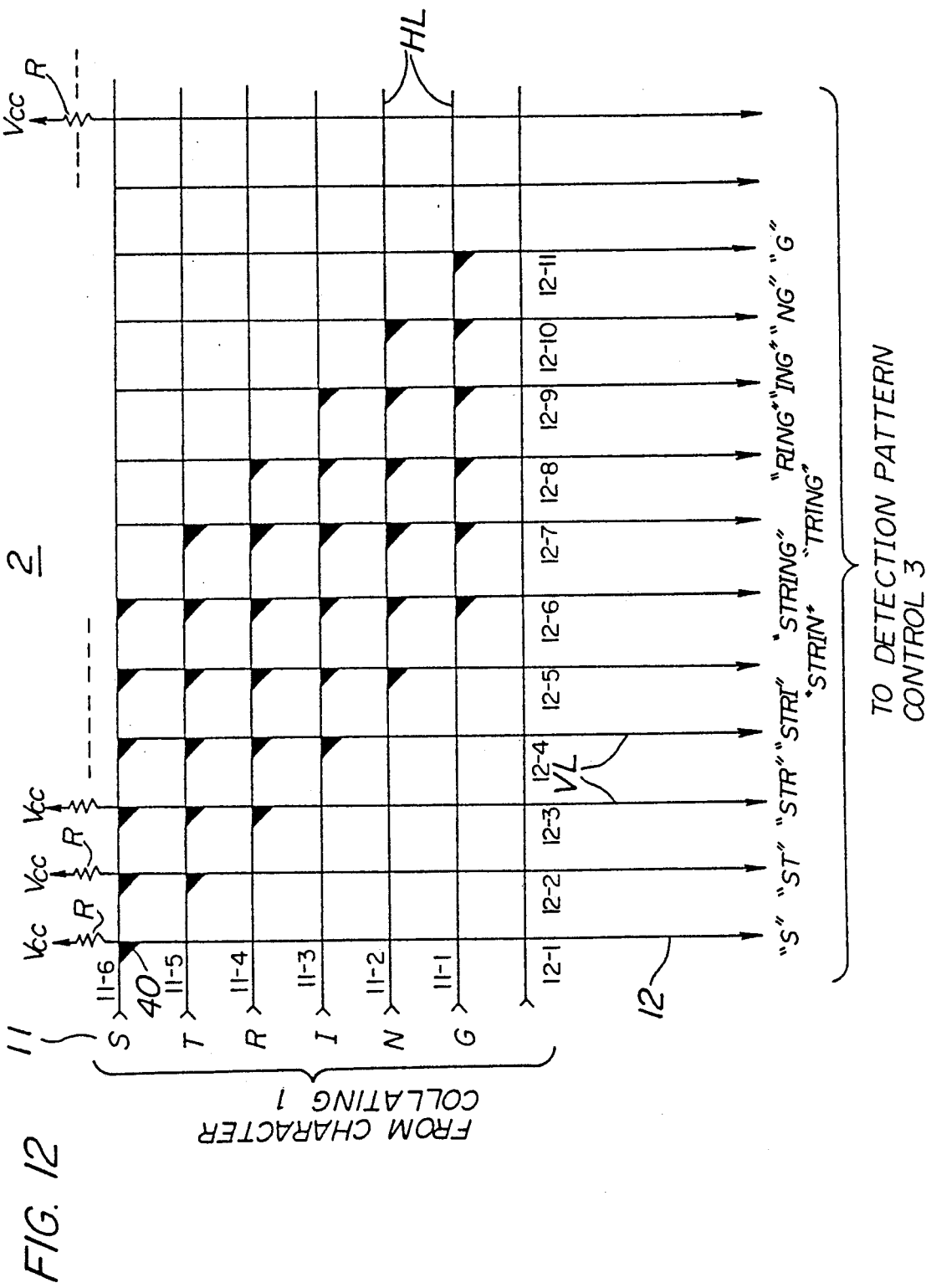
FIG. 12 is an annotated version of the circuit in FIG. 3, used in conjunction with the description of FIGS. 8-10.

Near the bottom of FIG. 11 (which is an annotated version of FIG. 2), data selector 20 selectively outputs a register input "a" or "b" in response to the select signal 6, and the selector 21 selectively outputs a clock input "a" or "b" in response to the select signal 6. Data selector 20 outputs the register input "a" and the data selector 21 outputs the clock input "a" during a low-level period of the select signal 6. On the other hand, the data selector 20 outputs the register input "b" and the data selector 21 outputs the clock input "b" during a high-level period of the select signal 6.

A description is now given of the operation of registering the character string "STRING" and thereafter detecting the registered character string from character strings which are input, by referring to the exemplary timing diagram in FIG. 8. During pulses "1" through "6" of the shift clock 5, the data selector 10 supplies the input data 10 to the registers 31 as the register input "a" to the shift register 31a, and thus, the six characters "S", "T", "R", "I", "N" and "G" are registered in the six registers 31 after the pulses "1" though "6" of the shift clock 6. Since the select signal 6 has a high level from the pulse "7" and after, data selector 10 supplies the input data 10 to registers 32 as the register input "b" to shift register 32a. If the character string "STRING STRING" is input during the pulses "7" through "20" of the shift clock 5, the six characters "STRING" are input to the shift register 32a as the register input "b" at the pulse "12" of the shift clock 5. As a result, the levels of character collating signals 11-1 through 11-6 and partial character string collating signals 12-1 through 12-11 become high. Int his state, the collating result signal 13-1, which indicates a perfect match to the registered character string, becomes active. A similar situation occurs at the pulse "19" of the shift clock 5.

FIG. 9 is a timing diagram illustrating operation when only one character of the input character string is different from the registered character string. Similar to the case shown in FIG. 8, the character string "STRING" is transferred to the shift register 31a by the end of the pulse "6? of the shift clock 5. When the character string "ATRING SPRING" is input from the pulse "7" of shift clock 5, the signal levels of character collating signals 11-1 through 11-6 become high, and the partial character string collating signals 12-7 through 12-11 become high at the pulse "12" of the shift clock 5. As a result, the signal levels of the collating result signals 13-2 and 13-8 become high, and character strings "TRING" and "**RING" are respectively detected. In addition, at pulse "19" of the shift clock 5, when input of the character string "SRRING" ends, the levels of the collating result signals 13-1, 13-8 and 13-9 become high, and the character strings "S*RING", "RING" and "SING" are respectively detected.

FIG. 10 is a timing diagram illustrating operation when the input character string includes one less or one more character than the registered character string. Similar to the case shown in FIG. 8, the character string "STRING" is transferred to the shift register 31a by the end of the pulse "6" of the shift clock 5. When the character string "SRING STTRING" is input from the pulse "7" of the shift clock 5, the signal levels of the character collating signals 11-1 through 11-4 become high at the pulse "11" of the shift clock 5, and the signal level of the character collating signal 11-6 becomes high at the next pulse "12" of the shift clock 5. Hence, the signal levels of the character string collating signal 12-1 and the character string collating signal 12-8 of one pulse of the shift clock 5 before become high. As a result, the signal level of collating result signal 213-1 becomes high, and the character string "SRING", which is missing one character "I", is detected. On the other hand, when the character string "STTRING" having one excess character "T" is input, the signal levels of character string collating signals 12-1 and 12-2 become high at the pulse "18" of the shift clock 5, and the signal level of character string collating signal 12-8 becomes high at the next pulse "19" of the shift clock 5. As a result, the collating signal 214-1 becomes high, and character string "S*TRING", having one excess character "T", is detected. At the same time, the signal level of collating result signal 214-2 also becomes high, and character string "ST*RING" is detected.

Figure 13:
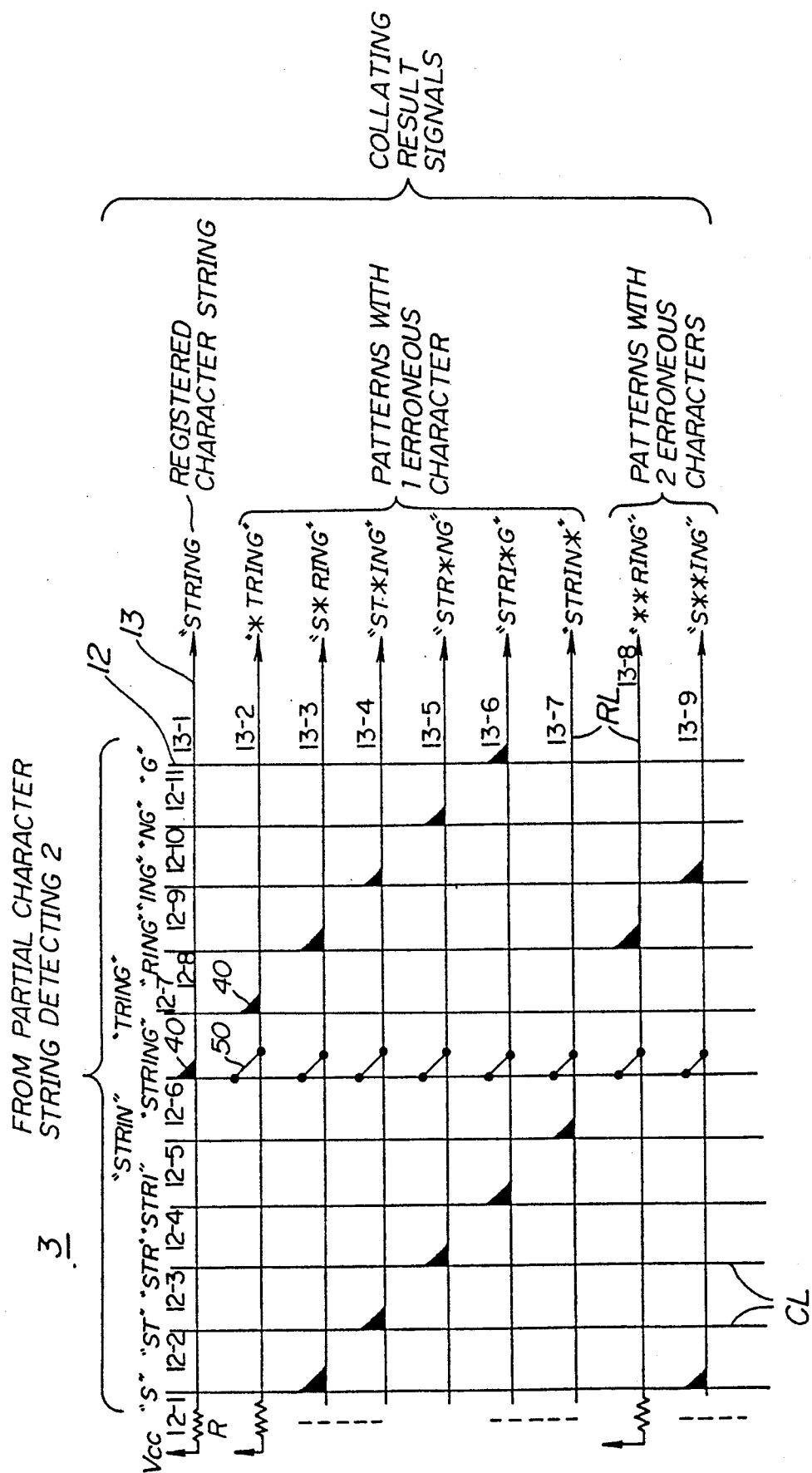
FIG. 13 is an annotated version of the circuit in FIG. 5, used in conjunction with the description of FIGS. 8-10.

The open collector type inverting buffer 50 shown in FIGS. 13 and 14 (FIGS. 5 and 7) outputs a high level signal when there is no match to the registered character string "STRING". Accordingly, when detecting the character string "*TRING" by the collating result signal 13-2, for example, the signal level of the collating result signal 13-2 becomes high when the first character is other than "S".

Further, the present invention is not limited to these embodiments, buy various variations and modifications may be made without departing from the scope of the present invention.

What is claimed is:

1. A variable length character string detection apparatus comprising:
   a) character collating means including:
      1) first means for registering a character string as a registered character string;
      2) second means for entering an input character string from a file; and
      3) comparator means for comparing each character of the input character string with characters making up the registered character string and for outputting character string collating signals which respectively indicate whether or not each character of the input character string coincides with one of the characters making up the registered character string;
   b) partial character string detecting means for:
      1) carrying out predetermined logic operations on the character string collating signals; and
      2) outputting partial character string collating signals which respectively indicate whether or not the registered character string which coincides with the input character string and partial character strings thereof exists; and
   c) detection pattern control means for:
      1) carrying out a predetermined logic operation on the partial character string collating signals; and
      2) outputting collating result signals which respectively indicate whether or not there exists the registered character string which coincides with:
         i) the input character string;
         ii) the partial character strings thereof; and
         iii) erroneous character strings which respectively include one or a plurality of consecutive errors;
   the detection pattern control means thus constituting means for detecting excessive, missing or erroneous characters.

2. The variable length character string detection apparatus as claimed in claim 1 wherein said erroneous character strings include a character string with one or a plurality of missing characters and a character string with one or a plurality of excessive characters.

3. The variable length character string detection apparatus as claimed in claim 1 wherein:
   said first means of said character collating means comprises first shift register means for storing each character of the character string which is to be registered in a corresponding one of N stages thereof, and
   said second means of said character collating means comprises second shift register means for storing each character of the input character string in a corresponding one of N stages thereof for comparison with the characters making up the registered character string in said comparator means.

4. A variable length character string detection apparatus comprising:
   a) character collating means including:
      1) first means for registering a character string as a registered character string;
      2) second means for entering an input character string form a file; and
      3) comparator means for comparing each character of the input character string with characters making up the registered character string and for outputting character string collating signals which respectively indicate whether or not each character of the input character string coincides with one of the characters making up the registered character string;
   b) partial character string detecting means for:
      1) carrying out predetermined logic operations on the character string collating signals; and
      2) outputting partial character string collating signals which respectively indicate whether or not the registered character string which coincides with the input character string and partial character strings thereof exists; and
   c) detection pattern control means for:
      1) carrying out a predetermined logic operation on the partial character string collating signals; and
      2) outputting collating result signals which respectively indicate whether or not there exists the registered character string which coincides with:
         i) the input character string;
         ii) the partial character strings thereof; and
         iii) erroneous character strings which respectively include one or a plurality of consecutive errors;
   the detection pattern control means thus constituting means for detecting excessive, missing or erroneous characters;
   wherein said partial character string detecting means comprises horizontal lines for receiving each of said character string collating signals, vertical lines respectively coupled to a fixed potential, and buffers for coupling predetermined ones of said horizontal lines to predetermined ones of said vertical lines, certain ones of said buffers which are coupled to the same vertical line obtaining a logical product of the character string collating signals which are received via the horizontal lines which are coupled to said certain buffers, said partial character string collating signals being output via said vertical lines.

5. The variable length character string detection apparatus as claimed in claim 4 wherein said buffers respectively comprise open collector type buffers.

6. A variable length character string detection apparatus comprising:
   a) character collating means including:
      1) first means for registering a character string as a registered character string;
      2) second means for entering an input character string from a file; and 3) comparator means for comparing each character of the input character string with characters making up the registered character string and for outputting character string collating signals which respectively indicate whether or not each character of the input character string coincides with one of the characters making up the registered character string;

b) partial character string detecting means for:
1) carrying out predetermined logic operations on the character string collating signals; and
2) outputting partial character string collating signals which respectively indicate whether or not the registered character string which coincides with the input character string and partial character strings thereof exists; and c) detection pattern control means for:
1) carrying out a predetermined logic operation on the partial character string collating signals; and
2) outputting collating result signals which respectively indicate whether or not there exists the registered character string which coincides with:
   i) the input character string;
   ii) the partial character strings thereof; and
   iii) erroneous character strings which respectively include one or a plurality of consecutive errors;

the detection pattern control means thus constituting means for detecting excessive, missing or erroneous characters;

wherein said detection pattern control means comprises vertical lines for receiving each of said partial character string collating signals, horizontal lines respectively coupled to a fixed potential, and buffers for coupling predetermined ones of said vertical lines to predetermined ones of said horizontal lines, certain ones of said buffers which are coupled to the same horizontal line obtaining a logical product of the partial character string collating signals which are received via the vertical lines which are coupled to said certain buffers, said collating result signals being output via said horizontal lines.

7. The variable length character string detection apparatus as claimed in claim 6 wherein said buffers comprise open collector type buffers and open collector type inverting buffers.

8. The variable length character string detection apparatus as claimed in claim 7 wherein said open collector type inverting buffers are respectively coupled to one of the vertical lines which receives the partial character string collating signal which corresponds to the registered character string.

9. A variable length character string detection apparatus comprising:
a) character collating means including:
1) first means for registering a character string as a registered character string;
2) second means for entering an input character string from a file; and 3) comparator means for comparing each character of the input character string with characters making up the registered character string and for outputting character string collating signals which respectively indicate whether or not each character of the input character string coincides with one of the characters making up the registered character string;

b) partial character string detecting means for:
1) carrying out predetermined logic operations on the character string collating signals; and
2) outputting partial character string collating signals which respectively indicate whether or not the registered character string which coincides with the input character string and partial character strings thereof exists; and c) detection pattern control means for:
1) carrying out a predetermined logic operation on the partial character string collating signals; and
2) outputting collating result signals which respectively indicate whether or not there exits the registered character string which coincides with:
   i) the input character string;
   ii) the partial character strings thereof; and
   iii) erroneous character strings which respectively include one or a plurality of consecutive errors;

the detection pattern control means thus constituting means for detecting excessive, missing or erroneous characters;

wherein said detection pattern control means comprises vertical lines for receiving each of said partial character string collating signals, horizontal lines respectively coupled to a fixed potential, one or a plurality of delay elements inserted in the vertical lines, and buffers for coupling predetermined ones of said vertical lines to predetermined ones of said horizontal lines, certain ones of said buffers which are coupled to the same horizontal line obtaining a logical product of the partial character string collating signals which are received via the vertical lines which are coupled to said certain buffers, said collating result signals being output via said horizontal lines.

10. The variable length character string detection apparatus as claimed in claim 9 wherein said buffers couple the predetermined vertical lines to the predetermined horizontal lines directly or via the one or plurality of delay elements.

11. The variable length character string detection apparatus as claimed in claim 9 wherein said buffers comprise open collector type buffers and open collector type inverting buffers.

12. The variable length character string detection apparatus as claimed in claim 11 wherein said open collector type inverting buffers are respectively coupled to one of the vertical lines which receives the partial character string collating signal which corresponds to the registered character string.

* * * * *